United States Patent
Hassbring et al.

(10) Patent No.: US 12,309,522 B2
(45) Date of Patent: May 20, 2025

(54) VIDEO MONITORING WITH ROBUST PRIVACY MASKING

(71) Applicant: Axis AB, Lund (SE)

(72) Inventors: Ludvig Hassbring, Lund (SE); Jessica Nilsson, Lund (SE); Tim Borglund, Lund (SE); Johan Nyström, Lund (SE); Michael Barnes, Lund (SE)

(73) Assignee: AXIS AB, Lund (SE)

( * ) Notice: Subject to any disclaimer, the term of this patent is extended or adjusted under 35 U.S.C. 154(b) by 406 days.

(21) Appl. No.: 17/886,650

(22) Filed: Aug. 12, 2022

(65) Prior Publication Data

US 2023/0108667 A1    Apr. 6, 2023

(30) Foreign Application Priority Data

Oct. 6, 2021 (EP) .................................. 21201103
Nov. 9, 2021 (EP) .................................. 21207174

(51) Int. Cl.
| | |
|---|---|
| *H04N 5/262* | (2006.01) |
| *G06V 20/52* | (2022.01) |
| *H04N 5/235* | (2006.01) |
| *H04N 23/71* | (2023.01) |
| *H04N 23/73* | (2023.01) |

(52) U.S. Cl.
CPC .............. *H04N 5/262* (2013.01); *G06V 20/52* (2022.01); *H04N 23/71* (2023.01); *H04N 23/73* (2023.01)

(58) Field of Classification Search
None
See application file for complete search history.

(56) References Cited

U.S. PATENT DOCUMENTS

| 11,069,036 B1* | 7/2021 | Simhadri ............... G06N 20/20 |
|---|---|---|
| 2009/0046147 A1 | 2/2009 | Henson |
| 2010/0119177 A1 | 5/2010 | Suzuki |
| 2015/0213702 A1 | 7/2015 | Kimmel |
| 2018/0204067 A1 | 7/2018 | Kazui |

(Continued)

FOREIGN PATENT DOCUMENTS

WO    2019/082652 A1    5/2019

OTHER PUBLICATIONS

Extended European Search Report dated Aug. 29, 2022 for European Patent Application No. 21207174.0.

(Continued)

*Primary Examiner* — Thomas D Lee
(74) *Attorney, Agent, or Firm* — Volpe Koenig

(57) ABSTRACT

A controller interacts with an image processing chain configured to process a video stream captured by a video camera and including an object detection algorithm which outputs a frame-wise detection score for each image region, and a masking function which applies a privacy mask in dependence of the detection score. When the controller detects a sudden change in luminance of a scene which is being imaged the video camera, it maintains or expands, for a period while the video camera is imaging the scene, the privacy mask which was applied at the detected sudden change. The maintaining or expanding of the privacy mask may be achieved by locally reducing a masking threshold applied by the masking function. The expansion of the privacy mask may be gradual over time and related to an estimated speed of a moving object in the scene.

14 Claims, 5 Drawing Sheets

(56) References Cited

U.S. PATENT DOCUMENTS

2020/0320665 A1 10/2020 Eswara et al.
2021/0097695 A1 4/2021 Lundberg et al.
2021/0209734 A1 7/2021 Simhadri et al.

OTHER PUBLICATIONS

Partial European Search Report dated Apr. 29, 2022 for European Patent Application No. 21207174.0.

* cited by examiner

VIDEO MONITORING WITH ROBUST PRIVACY MASKING

TECHNICAL FIELD

The present disclosure relates to the field of image processing and, in particular, to a privacy masking method which is robust under changing lighting conditions.

BACKGROUND

Privacy masking refers to techniques for removing areas of an image or a video frame for which no legitimate monitoring interest exists, as is the case with human faces, keypads, vehicle license plates etc. The areas can be removed by being replaced with other data (i.e., concealed) or modified by image processing such that any personal data therein becomes unintelligible. One state-of-the-art privacy masking product relies on an underlying neural network. The video frames are analyzed one at a time by the neural network. The neural network takes a video frame as input and outputs detection scores (e.g., confidence levels) which are indicative of a probability that an object in need of masking (face, keypad, license plate etc.) is visible in different pixels/regions of the input video frame. In order to mask the video frame to safeguard privacy, a privacy masking threshold is applied to the detection score map, such that pixels/regions in the video frame with a detection score above the privacy masking threshold are masked. Remaining pixels/regions in the video frame, for which the detection score is below the privacy masking threshold, remain visible. The state-of-the-art product uses a constant privacy masking threshold.

It has been noticed that the underlying neural network performs poorly when lighting conditions vary rapidly (e.g., artificial light being turned on or off), which may give rise to fluctuations and poor convergence. In particular, a temporary general decrease of the detection score of the neural network has been observed. When the detection score drops for this reason and the privacy masking threshold is unchanged, a previously masked object may become visible for a number of video frames, until the neural network is again outputting a detection score of the expected order of magnitude.

The unmasking of masked objects in the video, however short it may be, is unacceptable from a privacy point of view. For example, a few unmasked frames where a person's face is visible may be enough to identify the person and track him or her for the remainder of the video on the basis of clothing, bodily features or the like. In a monitoring application, however, it is also unacceptable to handle sudden lighting variations with excessive precaution, say, by a total blackening of the video image (video signal). Intruders who became aware that a monitoring system reacts in this way could utilize it to conceal themselves. For example, the intruders could provoke the blackening by flashing a light source at the monitoring camera while they enter the monitored scene. A balanced solution to the unmasking problem, which satisfies the privacy protection interest as much as the monitoring interest, would therefore be highly desirable.

SUMMARY

The present disclosure makes available methods and devices for interacting with an image processing chain which includes a masking function and is configured to process a video stream captured by a video camera Such methods and devices operate robustly in varying lighting conditions. Such methods and devices have an ability to adequately mask moving imaged objects through rapid luminance variations. A way of implementing these techniques that requires a limited amount of interfering with and reconfiguring of the image processing chain. A still further object is to formulate, for use in such methods and devices, suitable criteria for automatically finding the beginning and end of a period with rapid luminance variations. A particular objective is to provide such methods and devices for use with a video monitoring application.

At least some of these objectives are achieved by the disclosure as defined by the independent claims. The dependent claims relate to advantageous embodiments.

In a first aspect of the disclosure, there is provided a method of interacting with an image processing chain. The image processing chain is configured to process a video stream captured by a video camera. It includes an object detection algorithm, which outputs a frame-wise detection score for each image region, and a masking function, which applies a privacy mask in dependence of the detection score. An image region may be a pixel or a group of pixels. The method includes detecting a sudden change in luminance of the scene. When such a sudden change has been detected, the privacy mask which was applied at the detected sudden change is maintained or expanded for a period.

As used in this disclosure, a privacy masking operation may include removing or replacing image data in the image regions to be masked. "A privacy mask" refers to the spatial extent of the privacy masking in a given video frame, e.g., a collection of image regions. "Luminance" is not used necessarily in the objective physical sense (luminous intensity per unit area) but may further reflect the optical characteristics of the video camera, including the sensitivity of image sensors therein, which may in some conditions amplify the luminance of incident light nonlinearly. For example, the sudden luminance change may be detected on the basis of a sudden brightening of the video image, or on the basis of a different indirect criterion. Still further, luminance (or brightness) may refer to a component of an image signal.

When the method with the above features is executed, a privacy mask which had been determined and updated on the basis of reliable detection score data—and which may therefore be assumed to be well-adapted to the imaged scene up to the sudden change in luminance—is maintained for a period corresponding to a number of further video frames. Alternatively, the privacy mask is expanded, i.e., the privacy masking operation is applied to additional pixels or image regions. The positions occupied by the privacy-masked image features at the detected sudden change are also the likeliest future positions of the same image features, thereby suggesting that it makes sense to keep the privacy mask at least in the corresponding image regions. It is appreciated that the methods steps outlined above are performed while the video camera is imaging a same scene. If the scene is replaced or changes significantly, e.g., as a result of camera pan, tilt or zoom (unless these actions are known and the resulting image changes are duly compensated), the maintenance or expansion of the privacy mask may not achieve its intended effect. It is noted that the described method, with suitable tuning, is able to safeguard a desired level of privacy throughout an episode of rapid luminance variations without any need to take drastic precautionary measures, such as blackening the video image completely.

In some embodiments of the disclosure, the sudden change in luminance of the scene can be detected indirectly, by monitoring an average luminance, a luminance histogram, a luminance variance, an exposure mismatch ΔE, or an exposure-related control variable of the video camera. It may be particularly expedient to monitor the rate of change of these quantities, as estimated over the past few video frames.

Some embodiments of the disclosure have been conceived with particular attention to moving objects in need of masking, such as a walking person or a rolling vehicle with a visible license plate. According to these embodiments, when a moving object to which the privacy mask is applied is detected, the masking function is caused to expand the privacy mask around the moving object. To be precise, since the object detection algorithm may become temporarily unreliable as a result of the sudden change in luminance, the privacy mask is expanded around the latest known position of the moving object. Alternatively, an equivalent expanding-around effect may be achieved without knowing, at any point in time, the exact position of the moving object, namely, by ascertaining the image regions in which the privacy mask was applied because of a moving object and then expanding those image regions. Whichever of these options is implemented, the expanding of the privacy mask may be gradual over time. This accounts for the fact that the moving object's position becomes gradually more uncertain as time passes and also that it has more time to depart from its initial position. The amount of expansion may be proportional to an estimated speed of the moving object, wherein the speed is estimated at the detected sudden change. The expansion of the privacy mask may be restricted to an estimated direction of motion of the moving object, wherein the direction is estimated at the detected sudden change. The privacy mask—or that portion of it which relates to the moving object—may be translated in said estimated direction of motion.

Some embodiments of the disclosure allow a particularly simple integration of the present disclosure in existing technology. These embodiments are practicable when the masking function in the image processing chain applies a masking threshold which can be configured independently for each image region. Then, according to these embodiments, the masking function is caused to maintain or expand the privacy mask by reducing the masking threshold in any image region where the privacy mask was applied at the detected sudden change. This implements the disclosure with little or no need for costly and time-consuming modifications of the image processing chain.

A further group of embodiments focus on the length of the period during which the privacy mask is maintained or expanded. The period may be described as a recovery period for the video camera or for an autoexposure loop associated with the video camera. In one embodiment, the period's length is predetermined (and may be set in accordance with certain heuristics to be described below). Alternatively, the period is determined on the basis of a rate of change of an average luminance, a luminance histogram, a luminance variance, an exposure mismatch or an exposure-related control variable of the video camera; the rate of change may be estimated over successive frames of the video stream. Alternatively, the period is determined on the basis of the magnitude of the exposure mismatch when the sudden change in luminance is detected. Further alternatively, the period is determined on the basis of how much the average luminance deviates from a setpoint average luminance when the sudden change is detected.

Still further embodiments provide stop criteria for the period. More precisely, the period may be interrupted in response to determining that an exposure mismatch (or an absolute value thereof) has returned below a threshold. Alternatively, or additionally, the period may be interrupted when the detection score in an image region has risen to a level such that the masking function would apply the privacy mask in the same image region as at the detected sudden change; this behavior can be perceived as evidence that the video camera or autoexposure loop has recovered, so that the object detection algorithm outputs detection scores of the expected magnitude. At least some of these start and stop criteria can be robustly automated, and they are also easy to fine tune by adjusting threshold values and the like.

In a second aspect, there is provided a controller configured to interact with an image processing chain of the type already outlined. To this effect, the controller has processing circuitry and a memory. The controller is configured to detect a sudden change in luminance of a scene which is being imaged by the video camera and, for a period while the video camera is imaging the scene, to maintain or expand the privacy mask which was applied at the detected sudden change. This second aspect of the disclosure generally shares the effects and advantages of the first aspect, and it can be implemented with a corresponding degree of technical variation.

The disclosure further relates to a computer program containing instructions for causing a computer, or the controller in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the disclosure are shown. These aspects may, however, be embodied in many different forms and should not be construed as limiting; rather, these embodiments are provided by way of example so that this disclosure will be thorough and complete, and to fully convey the scope of all aspects of the disclosure to those skilled in the art. Like numbers refer to like elements throughout the description.

Figure 1:
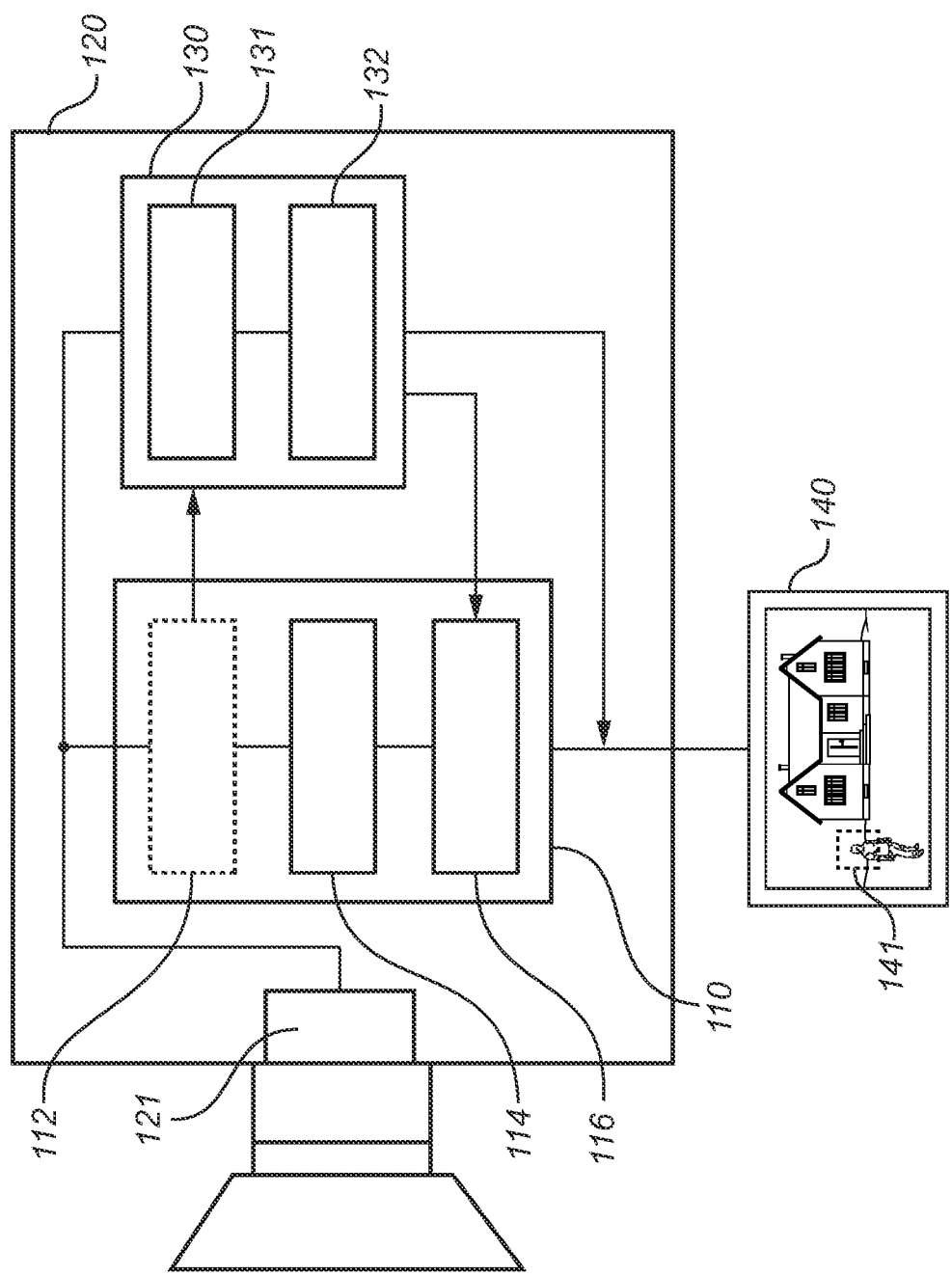
FIG. 1 shows a video camera with an integrated image processing chain and a controller configured to interact with the image processing chain in such manner as to ensure privacy masking through episodes of rapid luminance variations.

FIG. 1 shows a video camera 120 which is, on a high level, configured to output a video stream 140. The video camera 120 may be a digital video camera 120 adapted for monitoring or surveillance applications. It may be fixedly mounted. In the video camera 120, an image sensor 121 provides a raw video stream to an image processing chain 110. The image processing chain 110 may include an object detection algorithm 114, which is configured to output a frame-wise detection score for each image region. The image processing chain 110 may further include a masking function 116, which applies a privacy mask 141 in dependence of the detection score.

The object detection algorithm 114 may be configured or trained to detect objects in need of masking, such as human faces, keypads, vehicle license plates etc. The object detection algorithm's 114 detection score $D(i)$ for an image region $i$ may be a confidence level or a probability, which can be interpreted as the likelihood that an object of the detected type is present in the image region. Alternatively, the detection score can refer to a scale [0,1] in arbitrary units, the endpoints of which may conceptually carry labels such as 'no suggestion that an object is present' (0) and 'highest certainty that an object is present' (1). The detection score is provided as a value table or map, which associates each image region with a detection score value. Object detection algorithms which provide such detection scores are well-known and are commercially available. The masking function 116 may, for example, perform a thresholding operation such than the privacy mask is applied to image regions for which the detection score is greater than or equal to a masking threshold $D_0$. A simplified example with a mere nine image regions per frame and a constant masking threshold of $D_0=0.70$ is shown in Table 1.

TABLE 1

| | i | | | | | | | | |
|---|---|---|---|---|---|---|---|---|---|
| | 1 | 2 | 3 | 4 | 5 | 6 | 7 | 8 | 9 |
| D(i) | 0.09 | 0.15 | 0.14 | 0.55 | 0.81 | 0.34 | 0.77 | 0.85 | 0.22 |
| $D_0$ | 0.70 | 0.70 | 0.70 | 0.70 | 0.70 | 0.70 | 0.70 | 0.70 | 0.70 |
| mask | 0 | 0 | 0 | 0 | 1 | 0 | 1 | 1 | 0 |

The masking, which is applied to image regions 5, 7 and 8, may include removing visual features from the video image. For example, areas corresponding to image regions 5, 7 and 8 may be cropped or trimmed, and the image data therein may be permanently removed before the video stream leaves the video camera 120. Alternatively, the same image regions are overlaid with a static masking pattern, wherein the original image data is replaced by the masking pattern. Further alternatively, the image data in the image regions is processed into a blurred, pixelated or otherwise unintelligible condition. Pixelation may include dividing the area into smaller blocks, and replacing image data in each block by a single value, such as the average of the pixel values in the block or one of the pixel values in the block. A still further option is where the masking function 116 applies the privacy mask without modifying the video stream itself but instead attaches to the video stream a (mandatory) masking instruction to be executed by a playback application at the recipient's end. Accordingly, the raw video stream provided by the image sensor 121 may contain more information, or different information, than the processed video stream 140 that is output from the video camera 120.

The image processing chain 110 may optionally include an auto-exposure (AE) algorithm 112 configured to reduce an exposure mismatch by incrementing and decrementing an exposure-related control variable of the video camera. A video frame captured by the video camera 120 has an exposure mismatch if it does not correspond to a desired (or target, or setpoint) exposure level. The exposure mismatch may be represented as an indicator $\Delta E$ whose magnitude reflects the severity of the non-correspondence and whose sign corresponds to over- or underexposure. The exposure-related control variable, if the second option is used, may be exposure time, image sensor gain or similar variables. A typical range of the exposure time is 1 to 30 ms. The $\Delta E$ algorithm 110 may include a closed control loop which operates, for example, as a proportional (P) controller. The P controller may be stateful (adaptive) or stateless. The control loop may further include an integral (I) or a derivative (D) term, or both. The I and D terms make reference to a history (e.g., sliding window) of the exposure mismatch indicator E. In addition to adjustments to the exposure-related control variable, the $\Delta E$ algorithm 112 may apply compensatory processing to the raw video stream, with the aim of brightening underexposed frames and darkening overexposed frames. Depending on the characteristics of the object detection algorithm 114, the video stream can be fed to the object detection algorithm 114 before the $\Delta E$ algorithm's 112 compensatory processing or—as shown in FIG. 1—after the compensatory processing.

Further shown in FIG. 1 is a controller 130 configured to interact with the image processing chain in such manner as to ensure privacy masking through episodes of rapid luminance variations. A main functionality of the controller 130 is to analyze the video stream to detect a sudden change in luminance and, in the case of a positive detection, to maintain or expand the privacy mask which was applied at the detected sudden change for a period.

In the example shown in FIG. 1, the controller 130 performs the detection on the raw video stream provided by the image sensor 121. This allows highly responsive detection of luminance variations. Another possible option is to perform the detection on the video stream in its condition immediately downstream of the $\Delta E$ algorithm 112, i.e., after compensatory processing aiming to normalize the brightness of the video image, if any. The exposure-compensated video stream corresponds to the input data to the object detection algorithm 114. As such, detecting the luminance changes based on the exposure-compensated video stream may avoid certain false detection positives if the $\Delta E$ algorithm 112 is successful in compensating some of the sudden luminance variations that occur in the scene. In other words, a small or otherwise inoffensive luminance variation that does not destabilize the object detection algorithm 114, need not be managed actively.

FIG. 1 shows two alternative options by which the controller 130 may achieve the maintenance or expansion of the privacy mask. The controller 130 may reconfigure the masking function 116 (upper horizontal arrow), the controller 130 may process the video stream (lower horizontal arrow) before it is output from the video camera 120, or it may perform a combination of these. Within the second option, where the controller 130 processes the video stream to maintain or expand the privacy mask, the controller 130 need not be authorized to reconfigure or otherwise act upon the masking function 116; the controller 130 may however have read access to the output data or the input data or to configuration parameters of the masking function 116, so that the controller 130 is able to determine or reconstruct the privacy mask which was applied at the detected sudden change.

Figure 3:
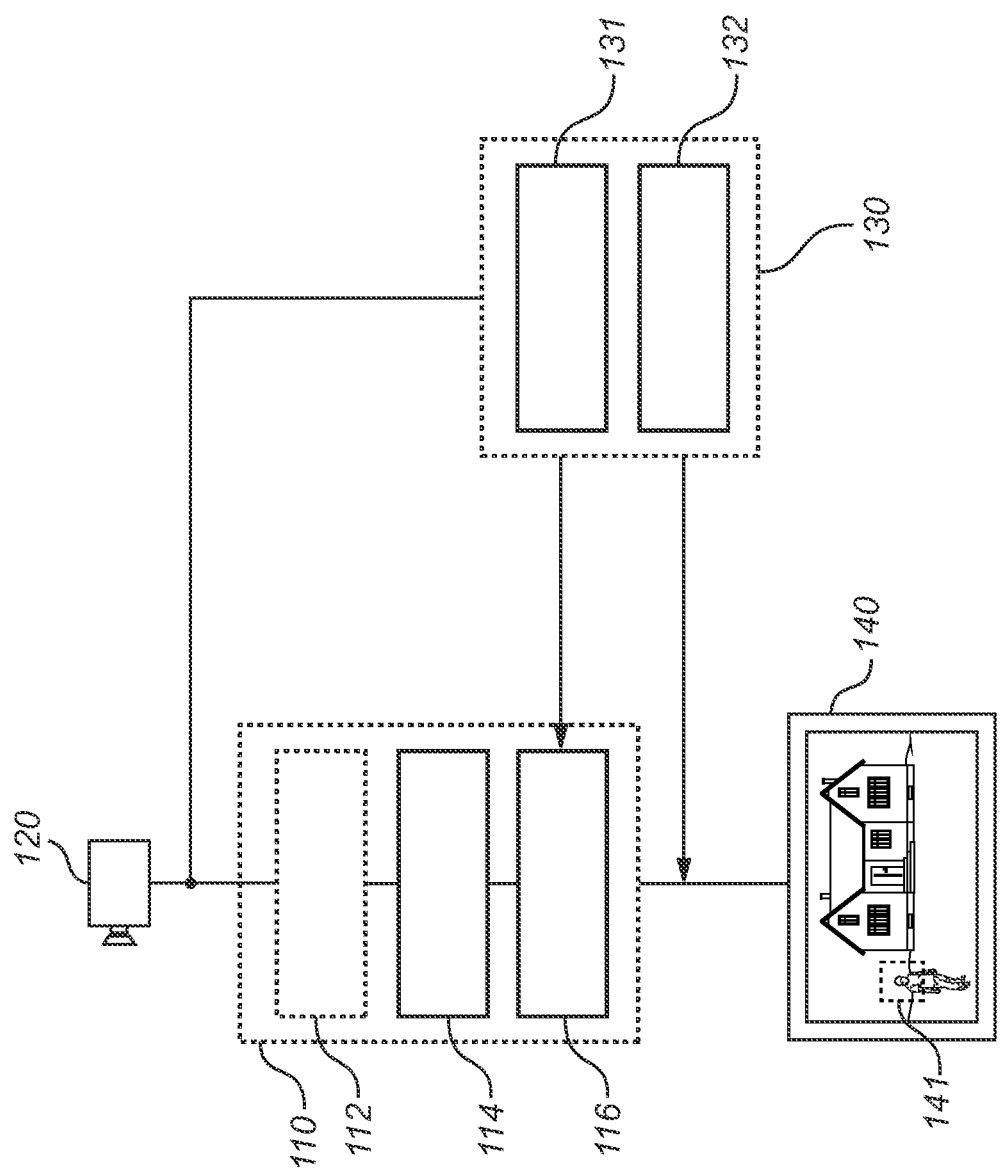
FIG. 3 shows a video camera with an external image processing chain and a controller configured to interact with the image processing chain in such manner as to ensure privacy masking through episodes of rapid luminance variations.

To fulfil the above-described functionalities, the controller 130 may include input and output interfaces (not shown), processing circuitry 131 and memory 132. As shown in FIG. 1, if the processing chain 110 includes an ΔE algorithm 112, the controller 130 may be configured to receive data from the ΔE algorithm 112, such as the exposure mismatch ΔE or exposure-related control variables. It is noted that FIG. 1, like FIG. 3, shows the controller 130 and other components in a block-diagram format where a block primarily reflects a function or an activity that is performed. The physical resources on which these functions or activities are implemented need not be organized or structured like the blocks in the drawings suggest. In fact, all or most of the blocks visible in FIGS. 1 and 3 may be implemented as software code to be executed on a common processing resource.

In the example shown in FIG. 1, the image processing chain 110 is integrated in the video camera 120, whereby the video stream does not leave the video camera 120 until the privacy masking has been applied; this protects against unauthorized parties trying to gain access to the video stream in its condition upstream of the masking, such as the raw video stream.

An imaginable alternative architecture is shown in FIG. 3, in which the image processing chain 110 and the controller 130 are external to the video camera 120. As suggested by their dashed contours, the image processing chain 110 and the controller 130 need not correspond to physical units but can be implemented in distributed and/or networked (cloud) processing resources which have access to the video stream and/or are authorized to reconfigure or inspect the masking function 116. In particular, the image processing chain 110 and the controller 130 can be executed by an external server, such as a video management system. The architecture according to FIG. 3 may optionally include a data connection from an ΔE algorithm 112 in the processing chain 110 to the controller 130, similar to what is shown in FIG. 1.

While not explicitly depicted in FIGS. 1 and 3, hybrid structures are possible as well, where at least some components of the image processing chain 110 are internal components of the video camera 120 and the controller 130 is external. For example, the ΔE algorithm 112 may be an internal component of the video camera 120. Then, to make the exposure mismatch ΔE and/or the exposure-related control variables available to the controller 130, the video camera 120 may incorporate this information as metadata of the video stream or transmit it on a separate frame-tagged (frame-stamped) channel. This is possible in the Exif image file format, where exposure settings for a frame can be read out.

A further alternative architecture is one where the masking function 116 applies the privacy mask without modifying the video stream itself but provides the video stream with a masking instruction to be executed by a video playback application. With this setup, the action of the controller 130 may be to modify or replace these masking instructions, so that the privacy mask which was applied at a detected sudden change is maintained or expanded for a period.

Figure 2:
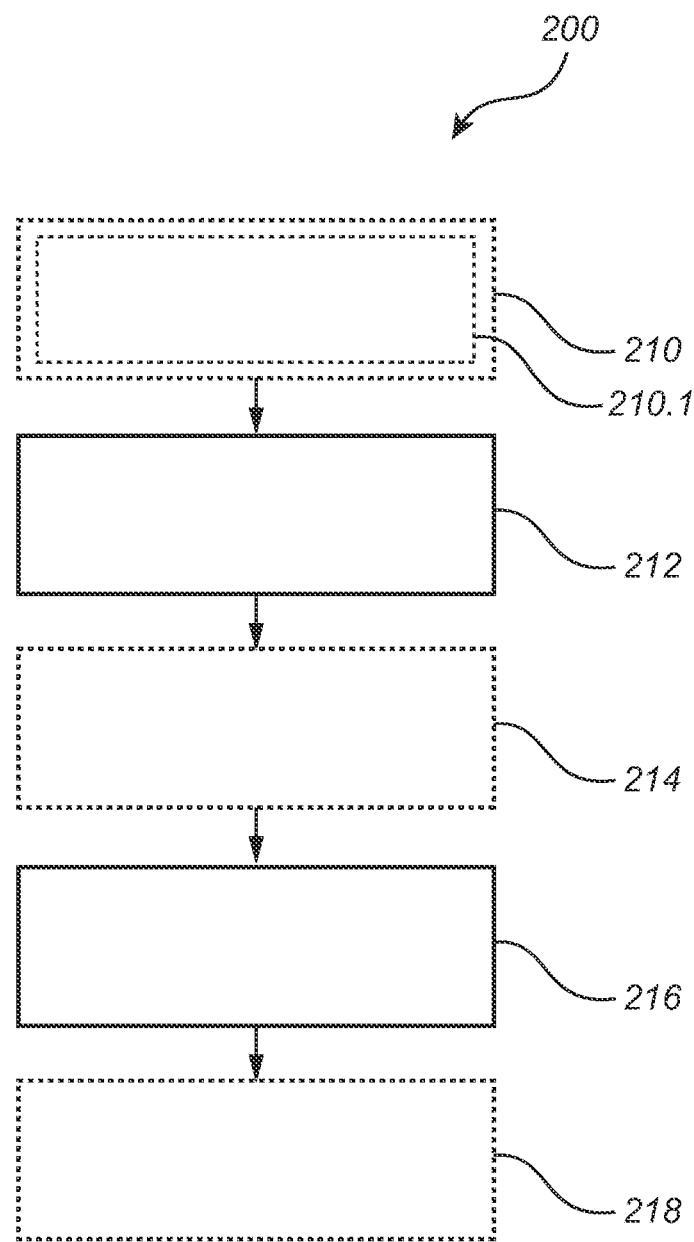
FIG. 2 is a flowchart of methods according to embodiments herein.

With reference to FIG. 2, a method 200 of interacting with an image processing chain 110 will now be described. The method 200 may be implemented in a controller 130 of the type exemplified in FIGS. 1 and 3.

In a detection step 212, to be executed while the video camera 120 is imaging a scene, the controller 130 attempts to detect a sudden change in luminance of the scene. As a special case, this includes a sudden change in luminance affecting only a portion of the scene. The controller's 130 detecting may include monitoring one or more of the following quantities for successive frames of the video stream: an average luminance, a luminance histogram, a luminance variance (e.g., variance across each video frame), an exposure mismatch ΔE, an exposure-related control variable of the video camera 120. These quantities may refer to the raw video stream or a processed version thereof, as read at a point further downstream of the image sensor 121. The monitoring may be performed separately for different sub-areas of the video frames. A sudden change in luminance may be deemed to be present when the rate of change of the monitored quantity exceeds a threshold value, such that the monitored quantity has in general changed by more than a threshold increment since the previous frame. Alternatively, the sudden change may be detected based on a criterion that the monitored quantity has changed by more than a threshold increment over the $n_0$ most recent frames, where $n_0 \geq 2$.

Figure 5:
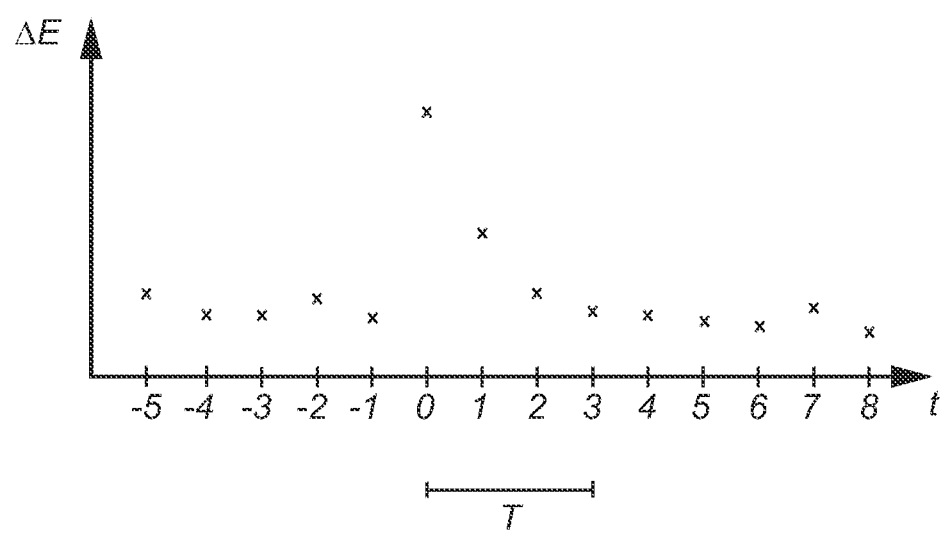
FIG. 5 shows a time evolution of an exposure mismatch indicator.

Such monitoring is illustrated for the exposure mismatch ΔE, a scalar-valued quantity, in FIG. 5. The beginning of the period of length T, during which the privacy mask is to be maintained or expanded, is marked by a rapid increase in exposure mismatch ΔE at t=0.

The rate of change of the luminance histogram may be observed by means of a distance measure, such as a vector norm ($L^p$, $-\ell^{\,p}$) or a probabilistic norm (Bhattacharyya distance, Kullback-Leibler distance, and many further options). Alternatively, the rate of change of the luminance histogram may be observed by tracking changes in the histogram average or the histogram variance (these statistics refer to the frequencies of respective bins in the histogram), or tracking the movement of selected reference points on the histograms.

The exposure-related control variable of the video camera 120 may be exposure time, image sensor gain, or similar variables. As explained above, the exposure-related control variable may be regulated in closed loop by an ΔE algorithm 112, whose task it is to monitor the exposure mismatch and adjust the exposure-related control variable accordingly. As a result, ignoring transients, a greater luminance of the scene eventually leads to a shorter exposure time, and vice versa. The option of monitoring the exposure-related control variable therefore provides a useful indirect way of detecting the sudden change of luminance in the scene, which avoids duplicating the ΔE algorithm's 112 existing luminance monitoring. Advantageously, in processing chains 110 where the control loop of the ΔE algorithm 112 includes a derivative (D) term for specifically counteracting sudden changes, the regulated exposure-related control variable may reflect the underlying luminance variations with particular emphasis.

In a refinement of the step 212, the sudden change in luminance is detected separately for different blocks (or portions) of the image. More precisely, it may be concluded that a first block of the video image is experiencing such a sudden change while second and third blocks are not. Then, the actions taken according to this method 200 in response to the sudden change can be restricted to the first block, as further explained below. This is relevant especially in a high dynamic range (HDR) scene where multiple exposures are sometimes used.

In connection with the detection step 212, an optional period determination step 214 may be performed. In this step 214, the length T of the period for which the privacy mask is maintained or expanded, is determined on the basis of a rate of change or a deviation magnitude for one or more of the quantities monitored in the detection step 212. Concretely, the determination may rely on:
- a rate of change, for successive frames of the video stream, of an average luminance, a luminance histogram, a luminance variance, an exposure mismatch $\Delta E$ or an exposure-related control variable of the video camera,
- a magnitude of the exposure mismatch $\Delta E$ at the detected sudden change, and/or
- a magnitude of the average luminance's deviation, at the detected sudden change, from a setpoint average luminance.

The setpoint average luminance may correspond to a desired average luminance. It may also form part of the configuration parameters of the $\Delta E$ algorithm 112.

In embodiments where the maintain/expand period is not determined during the execution of the method 200, a predetermined length T may be used. An example heuristic for setting the predetermined period's length is to relate it to a dynamic property of the $\Delta E$ algorithm 112, such as a duration of its impulse response. The impulse response duration is related to how fast the $\Delta E$ algorithm 112 counteracts an exposure mismatch of a given magnitude, and the impulse response duration may in turn depend on the configured values of various control gains in the $\Delta E$ algorithm 112. The impulse response duration may refer to the period in which the absolute value of the impulse response differs from zero by at least a positive threshold $\varepsilon > 0$, i.e., ignoring long tails. With this understanding, a relatively longer impulse response duration may signify that the image processing chain 110 needs relatively more time to recover from a sudden change in luminance of the scene, so that the privacy mask applied at the detected sudden change needs to be maintained (or expanded) for relatively longer to allow the object detection algorithm 114 to stabilize. Conversely, by analogous reasoning, the maintained privacy mask may be needed for relatively shorter time if the impulse response has a relatively shorter duration.

In a maintain/expand step 216, to be executed while the video camera 120 is still imaging substantially the same scene, one or more actions are taken to ensure that the privacy mask, which was applied at the detected sudden change, continues to be applied or is expanded for said period.

As explained above, such actions may include processing the video stream. If the masking function 116 is bypassed, the processing may include adding a complete privacy mask which covers at least the same image regions as at the detected sudden change. If instead step 216 entails processing the video stream at a point downstream of the masking function 116, the processing may include assessing whether the privacy mask applied by the masking function 116 still covers at least the same image regions as at the detected sudden change. If it does not, privacy masking is added in those image regions where the privacy mask is missing.

Alternatively, the actions in step 216 may include modifying a setting of the masking function 116. Specifically, assuming the masking function 116 uses a masking threshold $D_0 = D_0(i)$ which can be configured independently for each image region i in the video frame F, the masking function 116 can be caused to maintain or expand the privacy mask by reducing the masking threshold in any image region where the privacy mask was applied at the detected sudden change. If the privacy mask was applied for the image regions $i \in I$ at the detected change, where $I \subseteq F$, then the masking threshold reduction may correspond to the assignment $D_0(i) \leftarrow \alpha$ for all $i \in I$, where $\alpha$ is a small constant value, such as $-\infty$ or 0 or the minimum defined value of the detection score. The assignment leaves the masking threshold $D_0(i)$ unchanged for $i \notin I$. This way, the thresholding operation in the masking function 116 will apply masking in all image regions $i \in I$ regardless of the detection score $D(i)$ that it receives from the object detection algorithm 114.

To illustrate how settings of the masking function 116 can be modified in order to implement step 216, reference is made to Table 1. It is assumed that Table 1 reflects a situation just before a sudden change in luminance occurs. As Table 1 shows, the privacy mask was applied in the image regions in the set $I = \{5, 7, 8\}$. Until the object detection algorithm 114 recovers from the sudden change, the object detection algorithm 114 will output reduced detection scores. To ensure that the privacy mask is nevertheless applied, a small constant value a (e.g., 0.00 or 0.02) is assigned to the masking threshold for all image regions that lie in I, as shown in Table 2.

TABLE 2

| | i | | | | | | | | |
|---|---|---|---|---|---|---|---|---|---|
| | 1 | 2 | 3 | 4 | 5 | 6 | 7 | 8 | 9 |
| D(i) | 0.11 | 0.04 | 0.08 | 0.12 | 0.08 | 0.07 | 0.03 | 0.02 | 0.09 |
| $D_0$ | 0.70 | 0.70 | 0.70 | 0.70 | α | 0.70 | α | α | 0.70 |
| mask | 0 | 0 | 0 | 0 | 1 | 0 | 1 | 1 | 0 |

When the detection step 212 is performed in a block-wise fashion, as outlined above, it may be advantageous to apply the masking/expansion step 216 only to those blocks where the sudden change in luminance has been detected. In particular, the masking threshold of the masking function 116 need only be reduced in image region overlapping with those blocks.

The masking/expanding step 216 may be executed until the period expires, that is, for T units of time. In some embodiments, the method 200 further includes a step 218 of event-based interruption of the period. More precisely, if any of:
- Event 1: the exposure mismatch has returned below a threshold, $|\Delta E| \leq \beta$;
- Event 2: the detection score D(i) in an image region has risen to a level such that the masking function would apply the privacy mask in the same image region as at the detected sudden change;

and/or
- Event 3: the rate of change, for successive frames of the video stream, of an average luminance, a luminance histogram, an exposure mismatch $\Delta E$ or an exposure-related control variable of the video camera has fallen below a threshold;

is determined, then step 216 will be discontinued. At this point, a new cycle of detecting 212 a sudden change in luminance in the scene can be initiated. With respect to Event 1, the value of the threshold β≥0 can be set by trial and error. More precisely, the video camera 120 when configured with different candidate values $\beta_1, \beta_2, \ldots$ can be exposed to rapid luminance variations, during which an operator monitors whether any unwanted unmasking of faces, keypads, license plates etc. occurs. The maximum candidate value that achieves this can be selected. Event 2 can be formulated as the following set of inequalities:

$$\forall i \in I, D(i) \geq D_0(i),$$

where I⊆F is the set of image regions where the privacy mask was applied at the detected sudden change. The set of inequalities can either be evaluated collectively (all need to be satisfied for normal operation to be resumed) or one by one. Under the second option, the normal operation may be resumed in an image region i as soon as the detection score is seen to have risen locally to a level reaching the threshold. In further variations of this embodiment, Event 2 may be relaxed into a criterion that, say, $D(i) \geq D_0(i)$ shall be fulfilled for at least a percentage of the image regions in I, such as 80% or 90%. The percentage may correspond to a degree of temporary unmasking that is deemed acceptable in the use case at hand.

Some embodiments of the method 200 are specifically adapted for handling moving objects in the scene. More precisely, if it is detected 210 that the scene contains at least one moving object to which the privacy mask is being applied at the time of the sudden change in luminance, then the privacy mask is expanded around the moving object. The detection 210 of a moving object can follow an indirect approach, wherein the centers of the privacy mask (or the centers of disjoint components of the privacy mask) are tracked over time. This eliminates the need to apply dedicated movement detection in addition to the object detection algorithm 114.

Because the object detection algorithm 114 cannot be assumed to provide useful detection scores right after the sudden change in luminance, the privacy mask may be expanded around the moving object's last known position in the video frame. This may be achieved in a position-agnostic manner as follows. It is again assumed that the privacy mask was applied in the image regions in an index set I. An open neighborhood of I, for any r>0, is defined as:

$$I_r = \{j : \text{dist}(j,i) < r \text{ for some } i \in I\},$$

where dist(•,•) is a distance function representing the distance between two image regions. It is recalled that Tables 1 and 2 refer to simplified conceptual examples, where the total number of image regions in the video frame is at least one order of magnitude lower than what would be a suitable masking granularity for a commercial monitoring video camera. For example, the image regions may be individual pixels in the frame, or square-shaped groups of 4, 16, 25 etc. pixels each. If I refers solely to the moving object, the act of expanding 216 the privacy mask may correspond to applying masking in all image regions in the neighborhood $I_r$. This can be achieved, for example, by reducing the masking threshold around the moving object. Then, in concrete terms, the small constant value a is assigned as masking threshold $D_0(i)$ for all $i \in I_r$. The radius r may be a predefined constant, $r = r_0$. Alternatively, the expansion of the privacy mask is gradual over time. Denoting by t=0 the time at which the sudden change in luminance occurs, the method 200 may mask the regions in a set $I_{r(t)}$, where r(t) is a nondecreasing function. For example, an affine function may be used:

$$r(t) = at + b,$$

where a>0 and b≥0.

In further developments of this embodiment, the method 200 further comprises estimating 210.1 a speed |v| of the moving object at the sudden change, and letting the rate at which the privacy mask is expanded be linearly or nonlinearly related to the speed estimate. More precisely, if the privacy mask is applied in a neighborhood $I_{r(t)}$, then the growth coefficient α of the affine function r(t) may be related to |v|. The relation may be linear or affine. With an affine relation, such as:

$$a = \partial |v| + \eta$$

with ζ, η>0, the dual contributions from both the position uncertainty as such, which grows with time, and the speed of movement |v| can be accurately captured.

In a still further development of this embodiment, the speed estimation 210.1 further includes estimating a direction of motion of the moving object at the sudden change, whereby an estimate of the motion vector v becomes available. This estimate may be used for two purposes. On the one hand, the expansion of the privacy mask can be substantially restricted to the estimated direction of motion, e.g., by adding image regions at the leading end but not the trailing end of the privacy mask. On the other hand, the privacy mask can be translated in the estimated direction of motion; in other words, the privacy mask is expanded in the direction of motion and reduced in the opposite direction. Each option is likely to follow the moving object with reasonable accuracy during the period, without obscuring the field of view by unnecessarily expanding the privacy mask.

Figure 4:
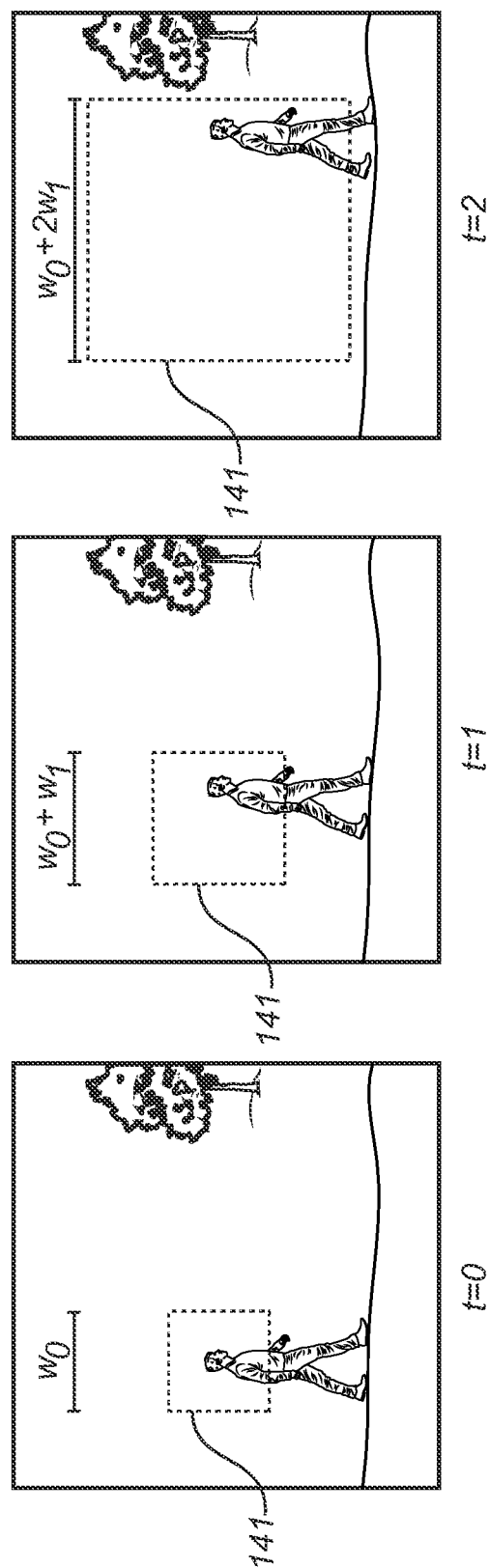
FIG. 4 shows three privacy-masked video frames acquired just before a sudden change in luminance (t=0) and at two subsequent points in time (t=1,2) which illustrate how masking of a moving object can be safeguarded by expanding the privacy mask gradually.

FIG. 4 illustrates a gradual expansion of a privacy mask 141 occasioned by a detected face of a walking person. The width (horizontal extent in the video frame) of the privacy mask 141 at the time of the sudden change in luminance (t=0) is $w_0$ units. During the period while step 216 is being executed, the width of the privacy mask 141 is gradually increased at t=1 and t=2, according to a function:

$$w(t) = w_0 + w_1 t,$$

where $w_1 > 0$ is a constant. The privacy mask 141 remains centered at the same image point, approximately corresponding to the position of the walking person's face at the sudden change. As illustrated, the gradual expansion of the privacy mask can be achieved without using the $I_r$ construct.

According to the first further development described above, the growth coefficient $w_1$ is related to an estimated speed |v| of the walking person. The speed refers to the movement as seen in the video image; it may be expressed in units of pixels per second. According to the second further development described above, the person's direction of movement is estimated and is found to correspond approximately to the cartesian vector (1,0). Under this second development (not shown in FIG. 4), it is possible to expand the privacy mask 141 in the width direction without expanding it in the height direction.

The aspects of the present disclosure have mainly been described above with reference to a few embodiments. However, as is readily appreciated by a person skilled in the art, other embodiments than the ones disclosed above are equally possible within the scope of the disclosure, as defined by the appended patent claims.

The invention claimed is:

1. A method of interacting with an image processing chain configured to process a video stream captured by a video camera, the method including:
- an object detection algorithm which outputs a frame-wise detection score for each image region, and
- a masking function which applies a privacy mask in dependence of the detection score, wherein the masking function is configured to apply the privacy mask to image regions where the detection score exceeds a masking threshold, which is configurable for each image region, wherein the following steps are performed while the video camera is imaging a scene:
- detecting a sudden change in luminance of the scene; and
- maintaining or expanding the privacy mask which includes reducing the masking threshold of the masking function in any image region where the privacy mask was applied at the detected sudden change for a period.

2. The method of claim 1, wherein said detecting a sudden change includes monitoring one of the following quantities for successive frames of the video stream:
- an average luminance,
- a luminance histogram,
- a luminance variance,
- an exposure mismatch,
- an exposure-related control variable of the video camera.

3. The method of claim 1, further comprising:
- detecting that the scene contains a moving object to which the privacy mask is being applied,
- wherein the privacy mask is expanded around the moving object.

4. The method of claim 3, wherein the privacy mask is expanded around the moving object gradually over time.

5. The method of claim 3, further comprising:
- estimating a speed of the moving object,
- wherein the privacy mask is expanded around the moving object in proportion to the estimated speed.

6. The method of claim 5, wherein the speed estimation includes estimating a direction of motion of the moving object; and wherein the expansion of the privacy mask is substantially restricted to the estimated direction of motion and/or the privacy mask is translated in the estimated direction of motion.

7. The method of claim 3, further comprising reducing the masking threshold around the moving object.

8. The method of claim 1, wherein the period's length is predetermined.

9. The method of claim 8, wherein the image processing chain further includes:
- an auto-exposure algorithm configured to reduce an exposure mismatch by incrementing and decrementing an exposure-time control variable of the video camera,
- wherein the period's length is related to a dynamic property of the auto-exposure algorithm.

10. The method of claim 1, further comprising:
- determining a length of the period on the basis of one or more of:
  - a rate of change, for successive frames of the video stream, of an average luminance, a luminance histogram, a luminance variance, an exposure mismatch or an exposure-related control variable of the video camera,
  - a magnitude of the exposure mismatch at the detected sudden change, and
  - a magnitude of the average luminance's deviation, at the detected sudden change, from a setpoint average luminance.

11. The method of claim 1, further comprising:
- interrupting the period in response to determining one or more of that:
  - an exposure mismatch has returned below a threshold, and
  - the detection score in an image region has risen to a level such that the masking function would apply the privacy mask in the same image region as at the detected sudden change.

12. The method of claim 1, wherein the video camera is fixedly mounted.

13. A non-transitory computer-readable storage medium having stored thereon instructions for implementing a method of interacting with an image processing chain configured to process a video stream captured by a video camera, when executed on a device having processing capabilities, the method including:
- an object detection algorithm which outputs a frame-wise detection score for each image region, and
- a masking function which applies a privacy mask in dependence of the detection score, wherein the masking function is configured to apply the privacy mask to image regions where the detection score exceeds a masking threshold, which is configurable for each image region, wherein the following steps are performed while the video camera is imaging a scene:
- detecting a sudden change in luminance of the scene; and
- maintaining or expanding the privacy mask which includes reducing the masking threshold of the masking function in any image region where the privacy mask was applied at the detected sudden change for a period.

14. A controller configured to interact with an image processing chain configured to process a video stream captured by a video camera and including:
- an object detector which analyzes a plurality of image regions and outputs a frame-wise detection score for each image region, and
- an object masking device which applies a privacy mask in dependence of the detection score, wherein the object masking device is further configured to apply the privacy mask to image regions where the detection score exceeds a masking threshold, which is configurable for each image region, wherein the controller comprises processing circuitry and a memory, and is configured to:
- detect a sudden change in luminance of a scene which is being imaged the video camera; and
- for a period while the video camera is imaging the scene, to maintain or expand the privacy mask which includes reducing the masking threshold in any image region where the privacy mask was applied at the detected sudden change.

* * * * *